United States Patent
Okajima et al.

(10) Patent No.: US 10,071,924 B2
(45) Date of Patent: Sep. 11, 2018

(54) DIFFUSION PIPE AND METHOD FOR CLEANING DIFFUSION PIPE

(71) Applicant: Kubota Corporation, Osaka (JP)

(72) Inventors: Yasunobu Okajima, Osaka (JP); Kazuo Nanri, Osaka (JP)

(73) Assignee: Kubota Corporation, Osaka (JP)

( * ) Notice: Subject to any disclaimer, the term of this patent is extended or adjusted under 35 U.S.C. 154(b) by 191 days.

(21) Appl. No.: 15/152,399

(22) Filed: May 11, 2016

(65) Prior Publication Data

US 2016/0251246 A1 Sep. 1, 2016

Related U.S. Application Data

(63) Continuation of application No. PCT/JP2014/079533, filed on Nov. 7, 2014.

(30) Foreign Application Priority Data

Nov. 13, 2013 (JP) .................................. 2013-234736

(51) Int. Cl.
*B08B 3/00* (2006.01)
*C02F 3/20* (2006.01)
(Continued)

(52) U.S. Cl.
CPC .......... *C02F 3/201* (2013.01); *B01F 3/04269* (2013.01); *B01F 15/00025* (2013.01);
(Continued)

(58) Field of Classification Search
None
See application file for complete search history.

(56) References Cited

U.S. PATENT DOCUMENTS

| | | |
|---|---|---|
| 2005/0151281 A1 | 7/2005 | Tharp |
| 2010/0300965 A1 | 12/2010 | Sakai |
| 2012/0193818 A1 | 8/2012 | Hirose |

FOREIGN PATENT DOCUMENTS

| | | |
|---|---|---|
| DE | 3218458 | 11/1983 |
| JP | 1-25679 Y2 | 8/1989 |

(Continued)

OTHER PUBLICATIONS

EPO machine translation of DE3218458 (Year: 1983).*

(Continued)

*Primary Examiner* — Eric W Golightly
(74) *Attorney, Agent, or Firm* — Beyer Law Group LLP (57) ABSTRACT

A diffusion pipe is provided in which the air diffusion efficiency can be quickly recovered just after conducting a cleaning process for the diffusion pipe with a cleaning solution supplied into the membrane support body, and in which air diffusion is evenly and constantly provided. The diffusion pipe includes a membrane body made of a viscoelastic material and formed in a tubular shape having an inner surface and an outer surface, and a tubular membrane support body that supports the membrane body from inside of the membrane body. The membrane body has a plurality of diffusion slits cutting therethrough between the outer surface and the inner surface. The membrane support body has through-holes on an upper side and a lower side thereof. The diffusion slits are not provided in a region of the membrane body corresponding to the through-holes.

5 Claims, 6 Drawing Sheets (51) Int. Cl.
  B01F 15/00  (2006.01)
  B01F 3/04  (2006.01)
  B08B 9/032  (2006.01)
  *C02F 3/12*  (2006.01)
(52) U.S. Cl.
  CPC .. B08B 9/0328 (2013.01); *B01F 2003/04319* (2013.01); *B01F 2215/0052* (2013.01); *C02F 3/1273* (2013.01); *C02F 2303/14* (2013.01); *Y02W 10/15* (2015.05)

(56) References Cited

FOREIGN PATENT DOCUMENTS

| | | |
|---|---|---|
| JP | 2004-305886 | 11/2004 |
| JP | 2005-081203 | 3/2005 |
| JP | 2005-334847 | 12/2005 |
| JP | 2006-15274 | 1/2006 |
| JP | 2008-221158 | 9/2008 |
| JP | 2009-172582 | 8/2009 |
| JP | 2009-274016 | 11/2009 |
| JP | 2011-92835 | 5/2011 |
| JP | 2011-125781 | 6/2011 |
| JP | 4781302 | 9/2011 |
| WO | 03/059537 | 7/2003 |

OTHER PUBLICATIONS

International Search Report dated Dec. 2, 2014 from PCT Application No. PCT/JP2014/079533 filed Jul. 11, 2014, 5 pages.
Matsuzaki, Yuko "Ultra Fine Bubble Membrane Tube Diffuser" No. 167 (2008), 6 pages.
"Journal of Sewerage Monthly" Jul. 2008, vol. 31 No. 8, 9 pages.

\* cited by examiner

DIFFUSION PIPE AND METHOD FOR CLEANING DIFFUSION PIPE

CLAIM OF PRIORITY

This application is a Continuation of International Patent Application No. PCT/JP2014/079533, filed on Nov. 7, 2014, which claims priority to Japanese Patent Application No. 2013-234736, filed on Nov. 13, 2013, each of which is hereby incorporated by reference.

BACKGROUND OF THE INVENTION

1. Field of the Invention

The present invention relates to a diffusion pipe and a method for cleaning the diffusion pipe.

2. Description of the Related Art

Diffusion pipes are widely used in a wastewater treatment device and the like, where such a diffusion pipe includes a tubular-shaped membrane body made of a viscoelastic material and a tubular membrane support body that supports the membrane body from inside of the membrane body, and the membrane body has diffusion slits cutting therethrough between an outer peripheral surface and an inner peripheral surface thereof.

Japanese Utility Model Publication No. H01-25679 (Y2) discloses a diffusion pipe in which an air pipe main body is provided with several holes, and a rubber tube having a number of cut holes is fit onto the pair pipe main body in order to prevent untreated wastewater from flowing backward into the diffusion pipe and clogging the diffusion slits. The holes are formed on a peripheral surface, including a side surface, of the air pipe main body constituting the diffusion pipe, and the diffusion slits formed as the cut holes are provided all over the membrane body.

Japanese Patent Laid-Open Application No. 2005-334847 discloses a diffusion pipe in which a tubular core member is made of a resin having one or more air-spouting holes evenly distributed on one side thereof, and a tubular air diffusion member formed of a porous membrane rubber or the like covers the core member. Air spouts from the air-spouting holes provided on one side of the core member, flows through a space between the core member and the air diffusion member, and then is discharged from the minute pores of the air diffusion member.

Japanese Patent No. 4781302 discloses a diffusion pipe in which an air pipe having a plurality of aeration openings is mounted on a base end of a tube base member, and an elastic film having slits on its peripheral portion covers the tube base member and the air pipe, such that the air is discharged through the slits. Similarly to the diffusion pipe of Japanese Patent Laid-Open Application No. 2005-334847, the air spouted from the aeration openings provided on one end of the diffusion pipe flows through a space between the tube base member and the elastic film, and then is discharged from the slits of the elastic film.

A diffusion pipe having such a structure that a membrane body formed of a tube-shaped viscoelastic body is fitted from outside onto a tubular membrane support body is supposed not to have a backflow problem in which sludge comes in through the diffusion slits formed on the membrane body. However, in reality, as the membrane body repeatedly expands and contracts in accordance with the air flowing through a space between the membrane support body and the membrane body, some of the sludge may flow in through the diffusion slits during such process. When the elasticity of the membrane body deteriorates as it ages and the amount of the sludge flowing in increases, the risk of clogging the diffusion slits also increases.

In addition, since the membrane body of such conventional diffusion pipes described above have diffusion slits formed all over including an area facing the through-holes formed on the membrane support body, most of the air supplied from the through-holes is spouted right away through the diffusion slits in the vicinity of the through-holes, thereby the diffusion becomes disadvantageously uneven along the axis direction of the diffusion pipe. In addition, the diffusion slits near the through-holes tend to lose the elasticity by opening widely, thereby undesirably increase the risk of pulling in the sludge when they open.

When the diffusion slits are clogged to a certain extent so as to decrease the air diffusion efficiency, a cleaning process is conducted in order to recover the air diffusion efficiency by supplying a cleaning solution into the membrane support body and cleans the diffusion slits. However, if the cleaning solution still remains inside the membrane support body when the air is supplied after the cleaning process, such residual cleaning solution interferes with emission of the air through the through-holes, thereby preventing a quick recovery of the air diffusion efficiency even after the diffusion slits have been cleaned.

BRIEF DESCRIPTION OF THE INVENTION

In view of the foregoing, an object of the present invention is to provide an diffusion pipe and a method for cleaning the diffusion pipe in which the air diffusion efficiency can be quickly recovered just after conducting a cleaning process for the diffusion pipe by supplying a cleaning solution into the membrane support body, and in which an even air diffusion is constantly realized.

In order to achieve the above-mentioned object, a first characteristic construction of an diffusion pipe in accordance with one embodiment of the present invention is that the diffusion pipe comprises a membrane body made of a viscoelastic material and formed in a tubular shape having an inner surface and an outer surface, and a tubular membrane support body that supports the membrane body from inside of the membrane body, where the membrane body is provided with a plurality of diffusion slits cutting therethrough between the outer surface and the inner surface, and the membrane support body has through-holes passing through a tube wall, provided on an upper side and a lower side of the membrane support body, and that the diffusion slits are provided so as to avoid at least a region of the membrane body corresponding to the through-holes.

Since the diffusion slits are not formed in the region of the membrane body that corresponds to an area in which the through-holes are provided, gas, for example, air that spouts from the through-holes is not immediately discharged from the diffusion slits, but flows through a space between the membrane support body and the membrane body before being discharged from the diffusion slits, without making the diffusion slits in a specific area open widely, thereby greatly reducing the risk of clogging the diffusion slits.

In addition, when a cleaning solution is supplied into the membrane support body for cleaning, and thereafter the air supply is resumed, the cleaning solution is discharged, by a pressure of the air, through the through-holes formed on a lower side of the membrane support body. The discharged cleaning solution then flows through the space between the membrane body and the membrane support body so as to be drained through the diffusion slits. In the meanwhile, the air is supplied along an axial direction through a space formed in an upper side of the membrane support body, spouts upward from the through-holes formed on the upper side of the membrane support body, flows through the gap between the membrane body and the membrane support body, and then is discharged from the diffusion slits, thereby the air diffusion efficiency is quickly recovered.

A second characteristic construction, in addition to the first characteristic construction described above, is that the upper side of the membrane support body has a plurality of through-holes arranged in a predetermined interval in a length direction of the membrane support body.

In accordance with the above-mentioned construction, the air spouted from the plurality of through-holes arranged on the upper side of the membrane support body in the predetermined interval in the length direction of the membrane support body is uniformly spread into the gap between the membrane body and the membrane support body and emitted from each diffusion slit of the membrane body, forming evenly dispersed air bubbles, thereby realizing uniform air diffusion along the length direction of through-holes membrane support body. In addition, when the membrane support body is filled with the cleaning solution in order to clean the diffusion pipe, the cleaning solution discharged from the plurality of through-holes arranged on the upper side of the membrane support body in the predetermined interval in the length direction of the membrane support body is evenly spread into the gap between the membrane body and the membrane support body, whereby each of the diffusion slits is provided with the cleaning solution so as to realize uniform cleaning along the length direction of the membrane support body.

A third characteristic construction, in addition to the second characteristic construction described above, is that the number of the through-holes formed on the lower side of the membrane support body is smaller than that of the through-holes formed on the upper side thereof, and the total opening area is also smaller than the total opening area of the through-holes arranged on the upper side of the upper side.

In accordance with the above-mentioned structure, a hydraulic pressure applied to the membrane body positioned on the upper side of the membrane support body is smaller than that applied to the membrane body on the lower side of the membrane support body, and when the gas is supplied into the membrane support body with a gas supply pressure, the push-up power of the gas spouting from the through-holes provided on the upper side of the membrane support body is greater than the push-down power of the gas spouting from the through-holes provided on the bottom side of the membrane support body, whereby the gap is stably formed between the upper side of the membrane support body and the membrane body. As a result, the gas spouting from the through-holes on the upper side of the membrane support body travels through the gap between the membrane body and membrane support body, and then is emitted stably as air bubbles from each of the diffusion slits.

A characteristic construction of a method for cleaning an diffusion pipe in accordance with one embodiment of the present invention, is a method of cleaning the diffusion pipe having the first to third characteristic constructions as described above, which includes filling an inside of the diffusion pipe with a cleaning solution by supplying the cleaning solution into the membrane support body while gas supply into the membrane support body is stopped, and then resuming the gas supply into the membrane support body after the cleaning, thereby draining out the cleaning solution from the diffusion pipe through the diffusion slits.

In accordance with the construction described above, the inside of the diffusion pipe is filled with the cleaning solution by supplying the cleaning solution into the membrane support body while the gas supply into the membrane support body is stopped, so as to clean the diffusion pipe. When the gas supply into the membrane support body is resumed after the cleaning process, the cleaning solution discharged from the through-holes on the lower side of the membrane support body passes through the gap between the membrane body and the membrane support body, and then is drained from the diffusion slits into the water to be treated. Accordingly, an upper aeration space is securely formed inside the membrane support body, such that the gas spouting from the through-holes on the upper side of the membrane support body travels through the gap between the membrane body and the membrane support body so as to be discharged as air bubbles from the diffusion slits, whereby the air diffusion efficiency is quickly recovered.

As described above, according to embodiments of the present invention, it has become possible to provide an diffusion pipe and a cleaning method of the diffusion pipe which allows the air diffusion efficiency to quickly recover immediately after cleaning the diffusion pipe by supplying a cleaning solution to the membrane support body, and which can provide air diffusion constantly and evenly.

DETAILED DESCRIPTION OF EMBODIMENTS OF THE INVENTION

Figure 1:
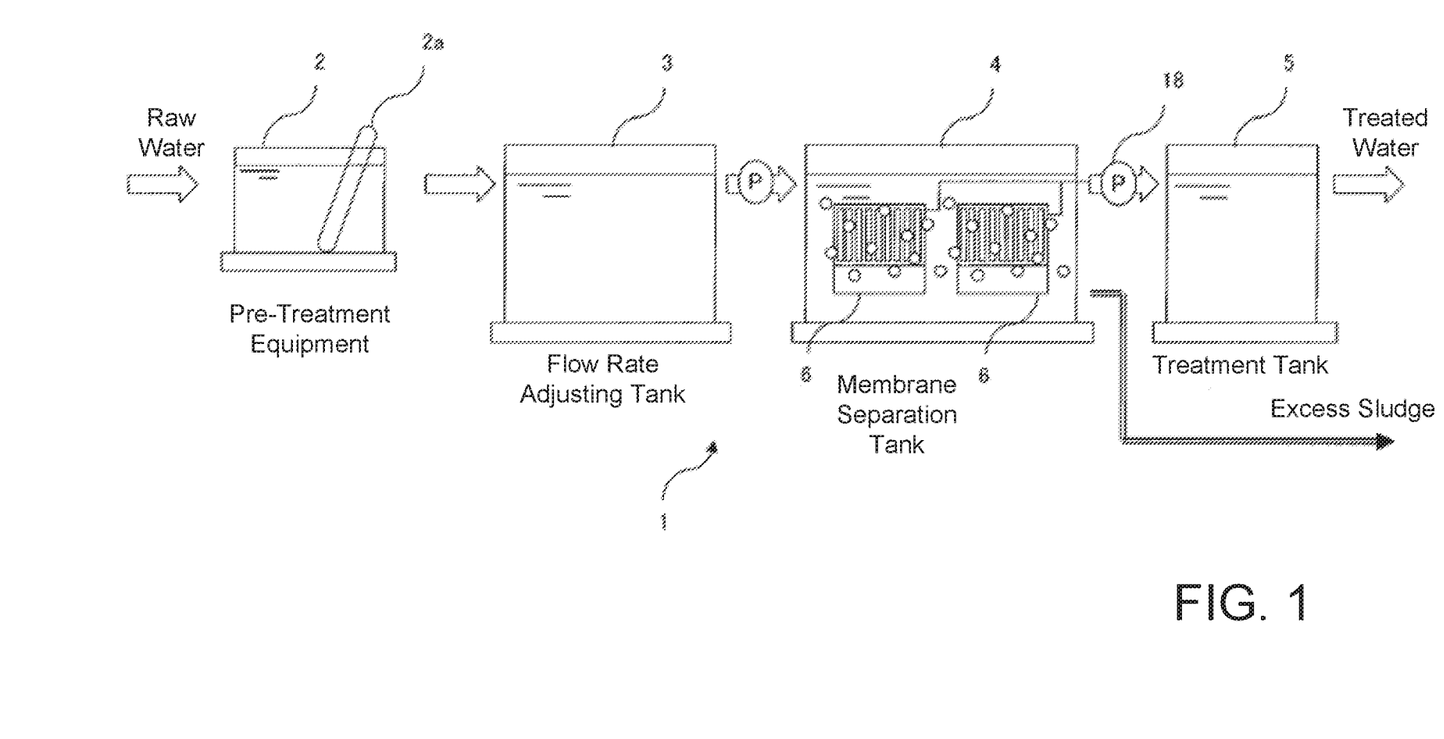
FIG. 1 is a diagram explaining a wastewater treatment facility.

The diffusion pipe and the method of cleaning the diffusion pipe will be described below. As shown in FIG. 1, a wastewater treatment facility 1 employing a membrane bioreactor process includes a pretreatment equipment 2, a flow rate adjusting tank 3, a membrane separation tank 4 having membrane separation devices 6 which are immersed in the membrane separation tank 4, and a treated water tank 5.

The pretreatment equipment 2 is provided with a screen 2a or the like which removes foreign elements mixed in raw water which is the water to be treated. After the foreign elements have been removed therefrom by the bar screen 2a or the like, the raw water is temporarily stored in the flow rate adjusting tank 3. A flow rate adjusting mechanism such as a pump P, valve, and the like is provided such that a constant flow of the raw water is steadily supplied from the flow rate adjusting tank 3 to membrane separation tank 4 even if the raw water inflow fluctuate.

In the membrane separation tank 4 which is filled with activated sludge, organic matter contained in the raw water is decomposed by a biological treatment process by the activated sludge, and permeated water which has been filtered via the membrane separation devices 6 is guided to the treated water tank 5 in which the permeated water is temporarily stored and then discharged. Excess of the activated sludge which has been multiplied in the membrane separation tank 4 is pulled out therefrom so as to maintain a constant concentration of the activated sludge.

Figure 2:
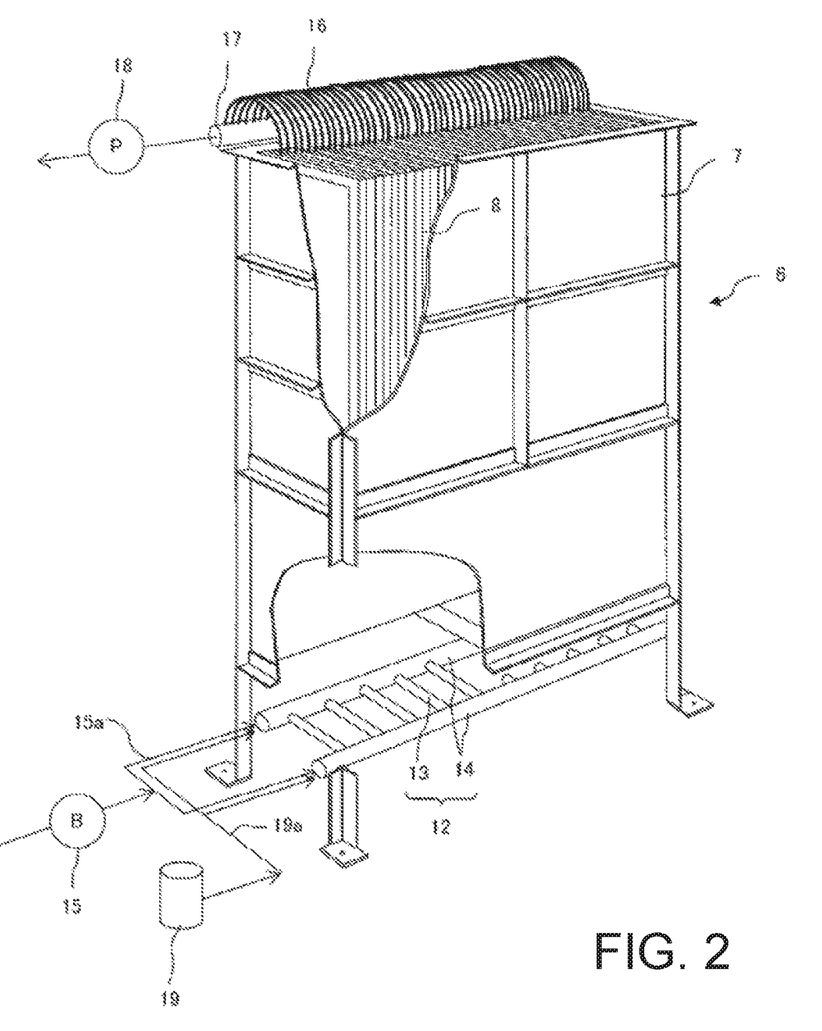
FIG. 2 is a diagram explaining a membrane separation device.

As shown in FIG. 2, each of the membrane separation devices 6 is provided with one hundred (100) plate-shaped membrane cartridges 8 disposed in a membrane case 7 having upper and lower open ends such that they are arranged in respective longitudinal positions and separated from each other with a fixed distance of about 6 mm to 10 mm (8 mm in this embodiment), and with a diffuser device 12 disposed under the membrane case 7.

The diffuser device 12 is provided with a plurality of diffusion pipes 13 each having a plurality of diffusion hole/slits, and each diffusion pipe 13 is connected via diffusion headers 14 and an air supply path 15a to a blower 15 provided outside of the thank. Each diffusion pipe 13 is also connected via the diffusion headers 14 and a cleaning solution supply path 19a to a cleaning solution supply device 19 provided outside of the tank. The cleaning solution supply device 19 has a flow rate control mechanism such as a pump, valve, and the like in order to supply a constant flow of the cleaning solution.

The membrane cartridges 8 are connected via a liquid collection pipe 17 to a pump 18 as a pressure difference generation mechanism provided external to the tank, whereby the water to be treated in the tank is sucked and filtered through membranes of the membrane cartridges 8.

Figure 3:
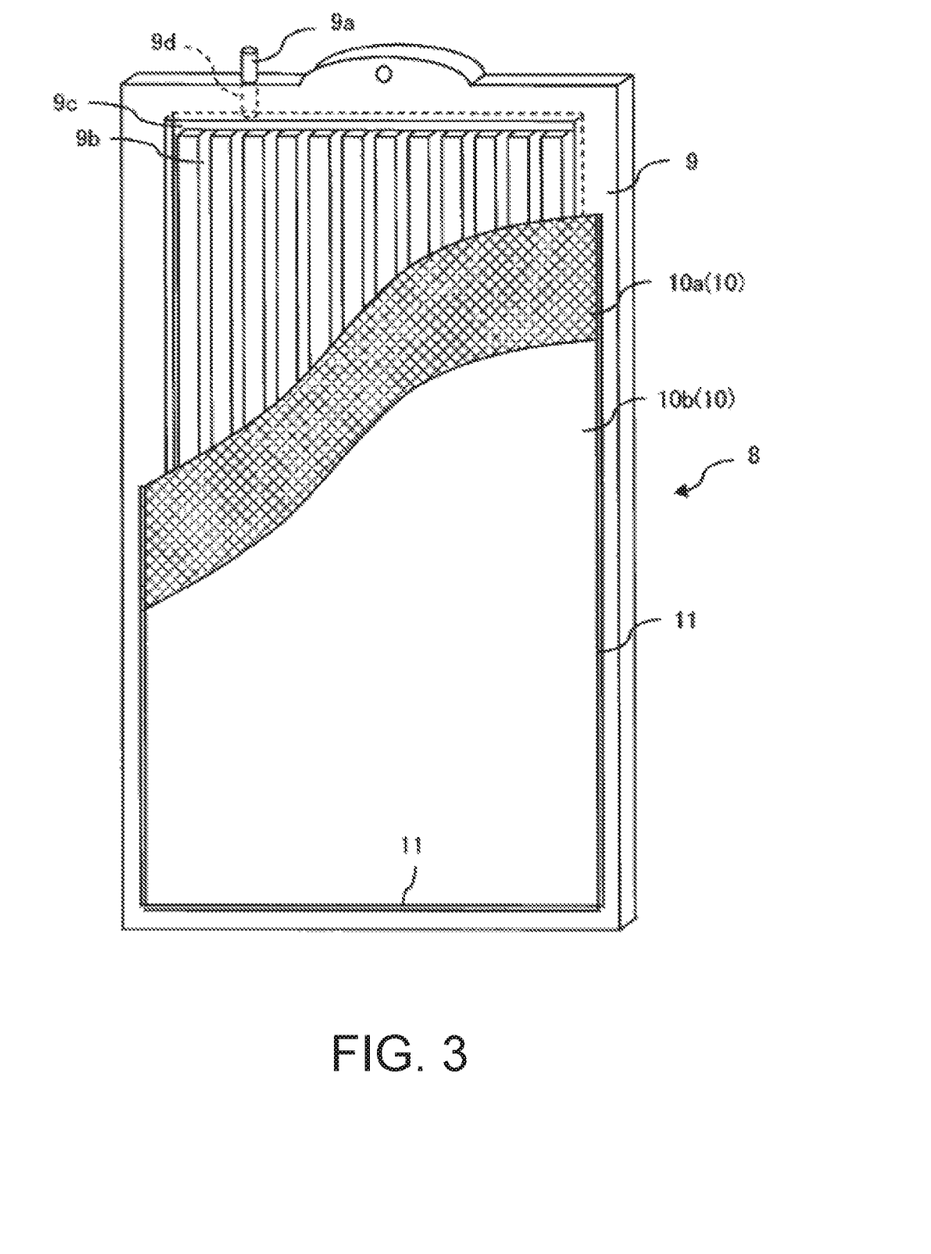
FIG. 3 is a diagram explaining a membrane cartridge.

As shown in FIG. 3, in each of the membrane cartridges 8, a separation membrane 10 is disposed on both of the front and rear faces of a filtration plate 9 made of a thermoplastic resin such as ABS resin having a height of 1000 mm and a width of 490 mm. Joining portions 11 provided at the periphery of the separation membrane 10 are bonded to the filtration plate 9 by ultrasonic or thermal welding, or using adhesive.

The separation membrane 10 is an organic filtering membrane in which a microporous membrane 10b having an average pore diameter of about 0.2 μm is formed on a support body 10a such as a nonwoven fabric made of PET, by coating and impregnating a porous resin thereon and therein.

A plurality of grooves 9b having a depth of about 2 mm and a width of about 2 mm are formed on a surface of the filtration plate 9 along a longitudinal direction thereof, and a horizontal groove 9c is formed at an upper end of the grooves 9b so as to communicate with each of the grooves 9b. The front and rear surfaces of the filtration plate 9 have respective horizontal grooves 9c which communicate with each other via a communication hole 9d which in turn communicates with a nozzle 9a formed at an upper edge portion of the filtration plate 9.

As shown in FIG. 2, each nozzle 9a is connected to the liquid collection pipe 17 via a respective tube 16, and the pump 18 is connected to the liquid collection pipe 17, such that the permeated water sucked by the pump 18 is transported to the treated water tank 5.

By operating the diffuser device 12 in each membrane separation device 6 and the pump 18, the air is supplied to the diffusion pipe 13 and air bubbles generated therein are provided to the membrane cartridges 8 so as to pass the water to be treated through the separation membranes 10, whereby a filtering process is performed to obtain the permeated water at a predetermined flow rate.

Then, a relaxation operation in which only the diffuser device 12 is operated while the pump 18 is stopped is performed, for example, regularly or when the suction pressure becomes high during the filtration operation, in order to prevent fouling of the separation membranes 10 while maintaining the characteristics of the activated sludge in the tank.

A chemical solution cleaning step using a chemical solution is also performed regularly or when the suction pressure becomes high after the relaxation operation, in which the separation membranes 10 are cleaned by injecting the chemical solution into each of the membrane cartridges 8 via the liquid collection pipe 17.

Figure 4:
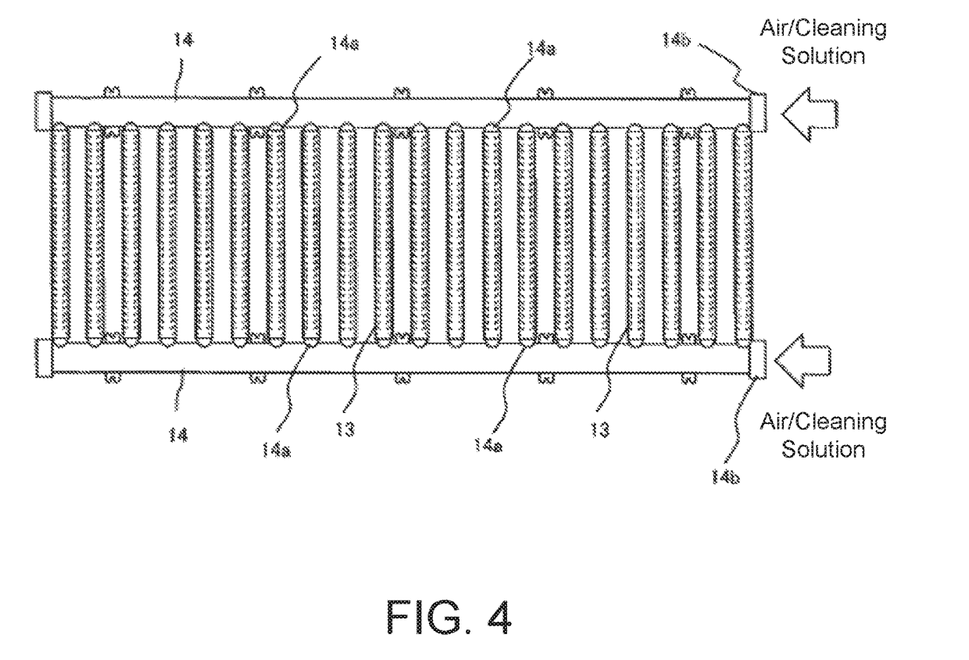
FIG. 4 is a plan view of an air diffusion device.

Next, the structure of the diffuser device 12 is explained. As shown in FIGS. 2 and 4, a plurality of diffusion pipes 13 are arranged in parallel to each other with a predetermined interval provided therebetween. One end of each of the diffusion pipes 13 is connected to one of the pair of diffusion headers 14, and the other end of each of the diffusion pipes 13 is connected to the other of the pair of diffusion headers 14. Each diffusion header 14 has on a side thereof a plurality of cylindrical connection mouths 14a corresponding to the diffusion pipes 13. The outer diameter of the connection mouths 14a is substantially the same as an inner diameter of the diffusion pipes 13. The diffusion pipes 13 are fitted onto the corresponding connection mouths 14a from outside, whereby the diffusion pipe 13 is fixed and connected to each of the diffusion headers 14.

One end 14b of each of the diffusion headers 14 is provided with an air inlet and a clearing solution inlet, and the other end thereof is closed. The air inlet is connected to an outlet of the air supply path 15a from the blower 15, while the cleaning solution inlet is connected to an outlet of the cleaning solution supply path 19a from the cleaning solution supply device 19.

Figure 5A:
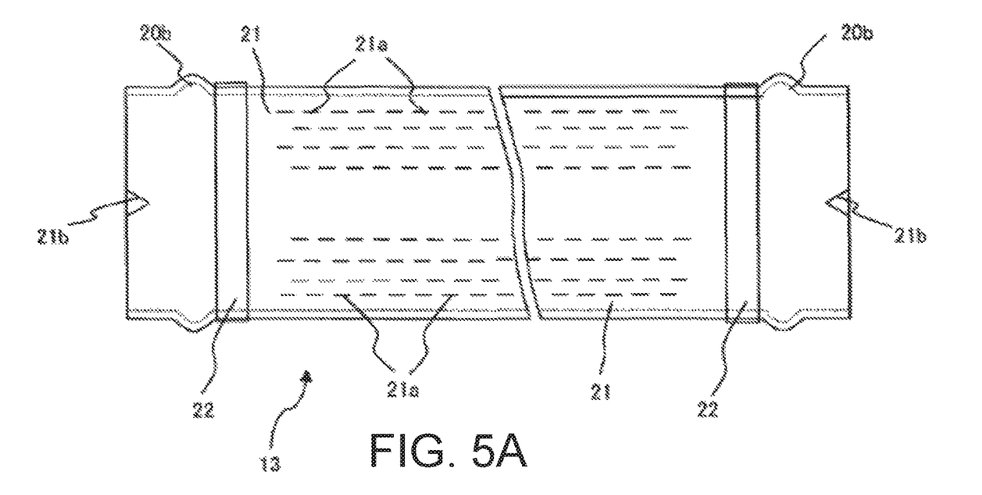
FIG. 5A is a plan view of a diffusion pipe.
Figure 5B:
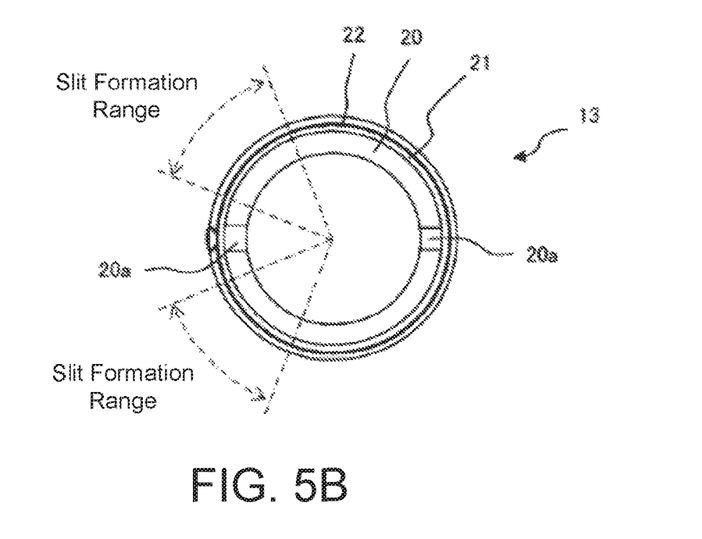
FIG. 5B is a side cross-sectional view of the diffusion pipe.

As shown in FIGS. 5A and 5B, each of the diffusion pipes 13 includes a cylindrical membrane support body 20, a membrane body 21 surrounding and covering an outer peripheral surface of the membrane support body 20, and a pair of bands 22 made of a metal (such as SUS304) fastening the membrane body 21 at both ends thereof so as to attach the membrane body 21 onto the outer peripheral surface of the membrane support body 20. FIG. 5A is a top plan view and FIG. 5B is a side cross-sectional view of the diffusion pipe 13, while the left side of FIG. 5B corresponds to the upper side of the diffusion pipe 13, and the right side of FIG. 5B corresponds to the lower side of the diffusion pipe 13.

Figure 6A:
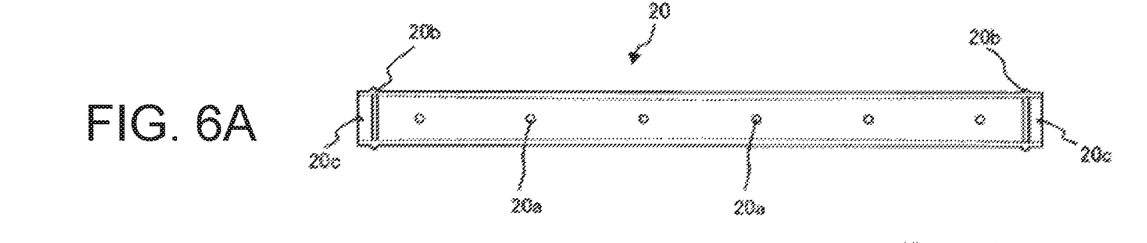
FIG. 6A is a plan view of a diffusion pipe.
Figure 6B:
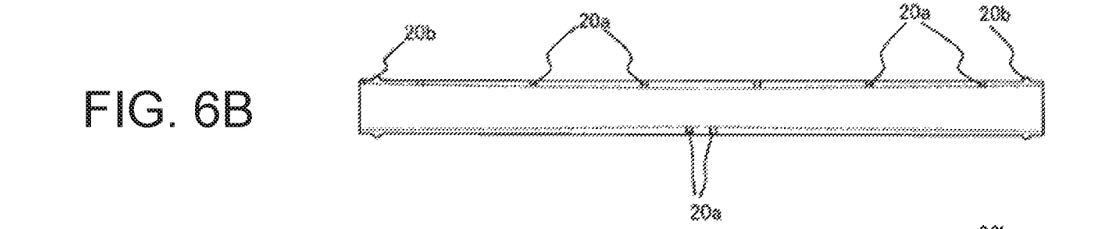
FIG. 6B is a longitudinal cross-sectional view of the diffusion pipe.
Figure 6C:
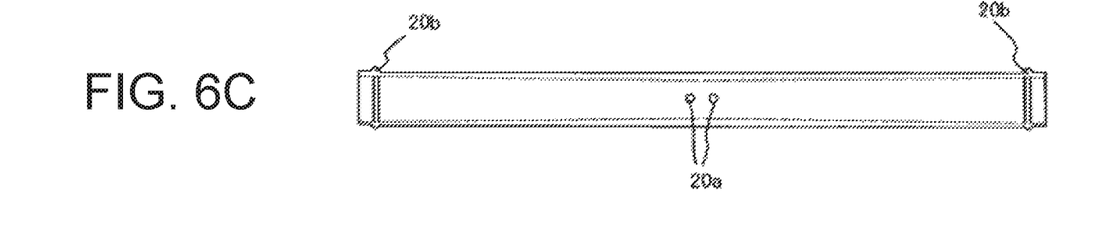
FIG. 6C is a bottom view of the diffusion pipe.

As shown in FIGS. 6A, 6B, and 6C, six (6) through-holes 20a are formed at a top of the upper side of the membrane support body 20 and arranged along the pipe axis direction (length direction) with an equal interval (100 mm), while two (2) through-holes 20a are formed at a bottom of the lower side of the membrane support body 20, arranged along the pipe axis direction with a small interval therebetween (20 mm) in the middle of the pipe axis (at a half length thereof). The diameter of each of the through-holes 20a is 5 mm φ. Accordingly, the number (2) and the total opening area of the through-holes 20a formed on the lower side of the membrane support body 20 are both smaller than the number (6) and the total opening area of the through-holes 20a formed on the upper side of the membrane support body 20.

The membrane support body 20 is formed of a tubular body made of an ABS resin having a wall thickness of about 4 mm. The membrane body 21 is made of a viscoelastic material such as EPDM, polyurethane resin, silicon rubber, or the like, and has a thickness of about 1 mm. The membrane body 21 is provided with a plurality of diffusion slits 21*a* formed by cutting though the membrane body 21 from the outer peripheral surface to the inner peripheral surface using a cutting tool.

As shown in FIG. 5B, in a side cross sectional view from the pipe axis direction of the diffusion pipe 13, the diffusion slits 21*a* are formed on both sides of the perpendicular line [orthogonal to and passing through the pipe axis] in an angular range of about 20 degrees to 70 degrees [around the pipe axis from the top of the diffusion pipe 13], and [as shown in FIG. 5A,] along the pipe axis direction, the diffusion slits 21*a* are formed in an inner region between the two bands 22. It should be noted that the broken lines in FIG. 5B may not illustrate the angular range precisely.

In addition, the diffusion slits 21*a* are arranged so as not to be formed in an area which corresponds to an area of the membrane support body 20 where the through-holes 20*a* are formed. The through-holes 20*a* may be formed on the upper or lower side of the membrane support body 20, and the areas in which the through-holes 20*a* are formed are not limited to the top center line of the upper side of the membrane support body 20 and the bottom center line of the lower side of the membrane support body 20, so long as the areas of the through-holes 20*a* do not overlap the area in which the diffusion slits 21*a* are formed.

A ring-shaped protrusion 20*b* is formed on the outer peripheral surface of the membrane support body 20 at the both end portions thereof. The membrane body 21 is mounted on the membrane support body 20 so as to cover the ring-shaped protrusions 20*b*, and the bands 22 are positioned at an inner (center) side of the ring-shaped protrusions 20*b*. The ring-shaped protrusions 20*b* prevent displacement of the membrane body 21 and the bands 22 with respect to the membrane support body 20.

A cutout 20*c* is formed on the top of the upper side of the membrane support body 20 at each edge thereof (see FIG. 6A). A cutout 21*b* is also formed on each edge of the membrane body 21 (see FIG. 5A). The membrane body 21 is mounted on the outer peripheral surface of the membrane support body 20 by aligning the position of the cutouts 21*b* of the membrane body 21 with the corresponding position of the cutouts 20*c* of the membrane support body 20, whereby the positions of the diffusion slits 21*a* are set within the angular range shown in FIG. 5B.

In accordance with the structure of the diffuser device 12 described above, air is supplied from the both ends of each diffusion pipe 13 such that the air pressure inside the membrane support body 20 becomes uniform along the pipe axis direction, and as the six (6) through-holes 20*a* are uniformly distributed at the top of the membrane support body 20 along the pipe axis direction with the same interval therebetween, the air spouted from the six (6) through-holes 20*a* at the top of the membrane support body 20 is also uniformized along the pipe axis direction. As a result, the membrane body 21 on the upper side of the membrane support body 20 is lifted up with a uniform force so as to form a uniform gap above the membrane support body 20 along the axis direction thereof.

The air spouted out from the six (6) through-holes 20*a* at the top of the membrane support body 20 hits the membrane body 21, flows downwardly from the side through the gap between the membrane body 21 and the membrane support body 20, and then is discharged into the water to be treated as air bubbles from the diffusion slits 21*a* of the membrane body 21.

Since the diffusion slits 21*a* are formed at positions in the upper side of the diffusion pipe 13 and in the vicinity thereof where the water pressure is low, the air spouted out from the through-holes 20*a* efficiently reaches the diffusion slits 21*a*, while avoiding undesirable direct-hitting onto the diffusion slits 21*a*, thereby realizing a high diffusion efficiency with uniformity along the pipe axis direction.

A cleaning process is performed when the diffusion efficiency of the diffuser device 12 decreases, or periodically, by supplying a cleaning solution into the diffuser device 12 from the cleaning solution supply device 19. In the cleaning process, the cleaning solution is supplied into the membrane support body 20 so as to fill the inside of the membrane support body 20, while air supply into the membrane support body 20 is stopped.

By leaving the diffuser device 12 as is for a predetermined period of time, by further injecting the cleaning solution into the membrane support body 20 with a pressure, or by combining the both, the cleaning solution filled the inside of the membrane support body 20 is discharged from each of the through-holes 20*a*, and then flows through the gap between the membrane body 21 and the membrane support body 20 so as to be in contact with the diffusion slits 21*a*, whereby the diffusion pipe 13 (especially the diffusion slits 21*a*) is cleansed.

After the cleaning process is finished, the air supply into the membrane support body is resumed. Due to the pressure of the air supplied into the membrane support body 20, the cleaning solution inside the membrane support body 20 flows out through the through-holes 20*a* provided at the lower side of the membrane support body 20, passes via the gap between the membrane body 21 and the membrane support body 20, and then is discharged into the water to be treated through the diffusion slits 21*a*.

Although the cleaning solution collects at the bottom of the inside of the membrane support body 20 due to its own weight, it will be well drained through the through-holes 20*a* formed at the lower side of the membrane support body 20.

As the cleaning solution inside the membrane support body 20 is drained, an upper aeration space is secured inside the membrane support body 20, and the air spouts from the through-holes 20*a* formed on the upper side of the membrane support body 20, travels through the gap between the membrane body 21 and the membrane support body 20, and then is discharged from the diffusion slits 21*a* as air bubbles.

Since the through-holes 20*a* are formed on the upper side of the membrane support body 20, as soon as a small aeration space is formed in an upper part inside the membrane support body 20, air bubbles are quickly spout from the diffusion slits 21*a*, whereby the air diffusion efficiency is quickly recovered.

The embodiments mentioned above are an example of the present invention, and the present invention is not limited by the description above. A design of the specific structure of each part can be changed so long as the function and effect of the present invention is achieved.

What is claimed is:

1. A diffusion pipe comprising:
   a membrane body made of a viscoelastic material and formed in a tubular shape having an inner surface and an outer surface, the membrane body being provided with a plurality of diffusion slits cutting therethrough between the outer surface and the inner surface; and
   a tubular membrane support body that supports the membrane body from inside of the membrane body, the membrane support body having a plurality of through-holes passing through a tube wall, provided on an upper side and a lower side of the membrane support body, wherein the plurality of through-holes include:
a first group of through-holes provided on the upper side of the membrane support body; and
a second group of through-holes provided on the lower side of membrane support body, the second group of through-holes being smaller in number and smaller in a total opening area than the first group of the through-holes.

2. The diffusion pipe of claim 1, wherein the first group of through-holes are arranged in a predetermined interval in a length direction of the membrane support body.

3. A method for cleaning the diffusion pipe of claim 1, the method comprising:
filling an inside of the diffusion pipe with a cleaning solution by supplying the cleaning solution into the membrane support body while gas supply into the membrane support body is stopped; and
resuming the gas supply into the membrane support body after cleaning, thereby draining out the cleaning solution through the second group of through-holes and the diffusion slits, while starting spouting gas bubbles from the diffusion pipe through the first group of through-holes and the diffusions slits.

4. The diffusion pipe of claim 1, wherein the diffusion slits are formed by avoiding at least a region of the membrane body corresponding to the through-holes.

5. The diffusion pipe of claim 1, wherein the first group of through-holes are disposed along a top portion of the membrane support body, while the second group of through-holes are disposed along a bottom portion of the membrane support body.

* * * * *